United States Patent Office 3,037,995
Patented June 5, 1962

3,037,995
PRODUCTION OF DERIVATIVES OF
2-AMINOQUINONES-1,4
Walter Gauss and Siegfried Petersen, Leverkusen-Bayerwerk, Germany, assignors to Farbenfabriken Bayer Aktiengesellschaft, Leverkusen, Germany, a corporation of Germany
No Drawing. Filed Mar. 2, 1959, Ser. No. 796,266
Claims priority, application Germany Mar. 6, 1958
5 Claims. (Cl. 260—396)

This invention relates generally to a new and improved method for the synthesis of organic chemical compounds. In particular, the invention involves the provision of a unique process for the production of N-substituted aminoquinone derivatives which have been shown to be useful as intermediates in the synthesis of organic solvent-soluble coloring agents or dyestuffs capable of effecting coloration of synthetic fibres as, for example, polyacrylonitrile fibres, and for dyeing films, coatings, varnishes and the like made from cellulose esters, cellulose nitrate, and similar cellulosic derivatives. The invention further involves the provision of certain novel dyestuff intermediates of the general class defined.

In our copending U.S. application Serial No. 726,060 (now U.S. Patent 2,913,453), which we filed jointly with one Gerhard Domagk on April 3, 1958, we have described and claimed a group of 2-amino-3-chloro-1,4-quinone-lower alkyl N-carboxylates which, due to their common 3-positioned chloro substituents, may be readily substituted with amino radicals to yield dyestuffs exhibiting good solubility in organic solvent systems including, by way of illustration, 3,5-bis-aziridino-2,6-diamino-1,4-benzoquinone-diethyl N,N'-dicarboxylate, among others. The aminoquinone-N-carboxylic acid ester intermediates of our aforementioned copending application are prepared by reacting quinones which are halogenated on the quinone nucleus with alkali metal compounds of carbamic esters.

The present invention is based, in part, on our discovery that quinone derivatives of the general class defined can be obtained also by reacting hydroquinones containing one or more amino or monoalkylamino groups with carbonic acid derivatives such as alkyl pyrocarbonates, halocarbonates, cyanic acid or salts of cyanic acid, isocyanates, or isothiocyanates, followed by treatment of the resulting reaction products with suitable oxidizing agents.

Particularly suitable aminohydroquinones for use in the first stage of our synthesis are the hydroquinones of benzene, naphthalene, and the hydroquinones of heterocyclic compounds having at least one amino group in the hydroquinone nucleus, such as 2-aminohydroquinone, 2,5-diaminohydroquinone, 2-amino-1,4-naphthohydroquinone, and 6-amino-5,8-dihydroxyquinoline. The aminohydroquinones may be further substituted with any desired radicals, such as halogen, alkyl, alkoxy or alkylmercapto groups. In the polynuclear hydroquinone compounds, the non-hydroquinoid nucleus may also contain one or several amino groups, or it may be wholly or partly hydrogenated. Examples of such compounds include 2,5-diamino-3,6-dichlorohydroquinone;
2-amino-3-chloro-5,6-dimethylhydroquinone;
2-amino-3-chloro-1,4-naphthohydroquinone;
2-amino-3-methoxy-1,4-naphthohydroquinone;
2-amino-3-methylmercapto-1,4-naphthohydroquinone;
6-amino-7-chloro-5,8-dihydroxyquinoline;
2-amino-3-chloro-5,6,7,8-tetrahydro-1,4-naphthohydroquinone;
5-amino-1,4-naphthohydroquinone, and
6-amino-1,4-naphthohydroquinone.

In addition to the aforementioned starting materials we may also employ hydroquinones in which one of the $NH_2$ groups is replaced by an alkyl radical. Compounds of this type include, by way of illustration, 2,5-bis-methylaminohydroquinone, 2-methylamino-1,4-naphthohydroquinone, and 2-methylamino-3-chloro-1,4-naphthohydroquinone.

The foregoing aminohydroquinones may be produced by conventional techniques, e.g., by reduction of the corresponding aminoquinones with catalytically activated hydrogen, sodium-dithionate, zinc dust in pyridine in the presence of sodium chloride solution, etc. In general, it is not necessary to isolate the aminohydroquinones, but in most cases the reduction mixture can be utilized directly, particularly if the catalytic reduction has been effected in an organic diluent. The aminohydroquinones can also be produced from aromatic nitro-dihydroxy compounds, the OH groups of which are in para position to each other.

The carbonic acid derivatives which may be reacted with the aminohydroquinones include dialkyl pyrocarbonates, alkyl halocarbonates, aryl halocarbonates, cyanic acid or metal cyanates, aliphatic and aromatic isocyanates, aliphatic and aromatic isothiocyanates, isothioureas, and cyanamide or substituted cyanamides.

In all of the condensation products of aminohydroquinones with the enumerated carbonic acid derivatives, one or more of the groups represented by the formula:

(A)
$$-\underset{\underset{X}{\overset{R}{|}}}{N}-C-Y$$

wherein R represents hydrogen or alkyl; X represents oxygen, sulfur, or the NH grouping; and Y represents alkoxy, aryloxy, or the $NH_2$, NH-alkyl, or NH-aryl groupings; are attached to hydroquinone molecule.

By way of illustration, a number of typical reactions are depicted below in terms of the formulae for the compounds involved:

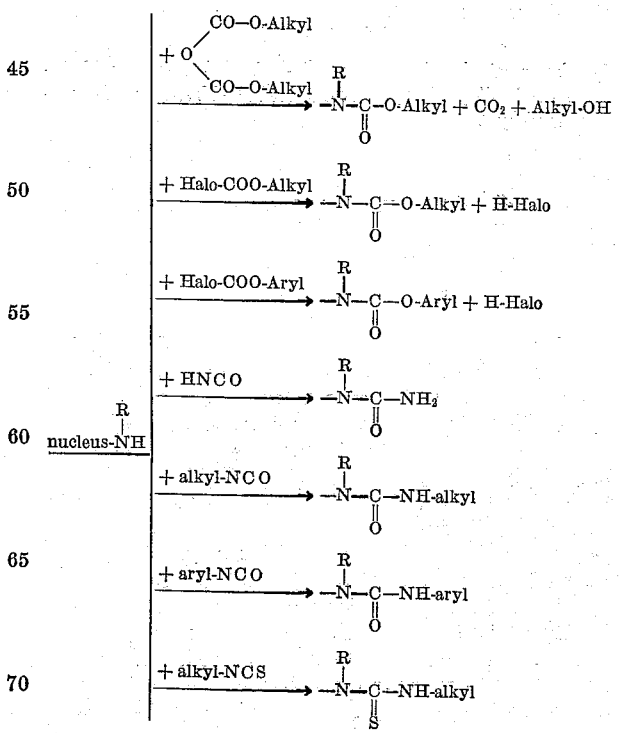

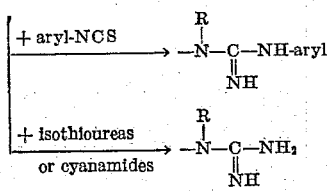

We prefer to employ one mole of the carbonic acid reagent, or a slight excess, to each basic reactive group contained in the aminohydroquinone. Use may also be made of bifunctional carbonic acid derivatives, in which case two aminohydroquinones, each containing a basic reactive group, may be interlinked to form defined compounds. Particularly useful compounds for this purpose are the diisocyanates and diisothiocyanates, among others.

Many of the reactions indicated hereinbefore take place at room temperature. When this is not the case, however, mild heating is sufficient. The reactions are preferably conducted within inert solvents or diluents. If halocarbonates are used, the addition of an acid acceptor is advisable in order to maintain the entire aminohydroquinone in uncombined form till the end of the reaction. The solutions or suspensions will then contain the hydroquinone derivatives in which the above-indicated partial general structure may occur once or several times. In many cases it is possible to isolate the products in the form of colorless solid compounds. On the other hand, substantially all of the compounds show the tendency to convert into colored compounds.

The actual oxidation of the foregoing products leads to quinone derivatives in which the grouping of Formula A is linked to the quinone molecule once or several times. Conversion of the hydroquinone derivatives into the corresponding quinones can be accomplished by means of oxidizers of the type of lead dioxide, ferric chloride, potassium bifluoride, or with molecular oxygen. Para-benzoquinone has been found to be especially advantageous for this purpose since it permits use of an organic medium, and the hydroquinone formed from it can be separated most readily.

It is believed that our invention may be best understood by reference to the following specific examples illustrating the application of the unique process of the invention to the production of typical quinone compounds of the class described:

EXAMPLE I

*Synthesis of the Compound, N-[Naphthoquinone-(1,4)-Yl-(2)]-N'-[Ethoxycarbonylmethyl]-Urea, as Represented by the Formula:*

(I)

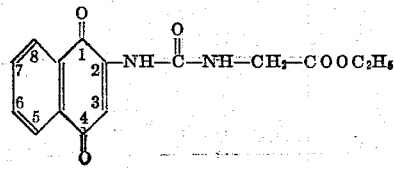

Fifteen (15) grams (0.0867 mole) of 2-amino-1,4-naphthoquinine were suspended in 100 cubic centimeters of ethyl acetate and hydrogenated to the corresponding hydroquinone in the presence of 4 grams of Raney nickel as catalyst. Thereafter, 11.2 grams (0.087 mole) of ethyl isocyanocacetate diluted with 20 cubic centimeters of ethyl acetate was slowly instilled into the reaction mixture with stirring. This resulted in mild spontaneous heating and formation of a thick slurry. After some time, this slurry was dissolved by addition of some alcohol and heating, and the reaction mixture was vacuum-filtered for removal of the catalyst. A solution of 9.4 grams (0.0867 mole) of p-benzoquinone in 50 cubic centimeters of alcohol was added to the filtrate, causing rapid formation of a thick, yellow precipitate which was filtered off at 0° C., washed with alcohol, and finally dried to yield 19.5 grams of the desired compound of Formula I (decomposition point=225–228° C.). Recrystallization from alcohol gave 16.3 grams of a yellow, analytically pure product decomposing at 228.0–229.5° C.

EXAMPLE II

*Synthesis of the Compound, 3-Methoxy-2-Amino-1,4-Naphthoquinone-Ethyl N-Carboxylate, as Represented by the Formula:*

(II)

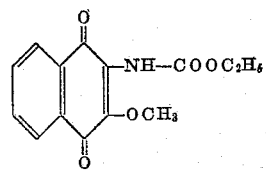

2-amino-3-methoxy-1,4-naphthoquinone, in amount of 10.8 grams, in 100 cubic centimeters of ethyl acetate was catalytically reduced to the corresponding hydroquinone in the presence of Raney nickel. Subsequently, 9.7 grams of diethyl pyrocarbonate were added to the reaction mixture, and the mixture was slowly heated to the boil until no more carbon dioxide evolves. After cooling, the catalyst was separated by vacuum filtration, and the filtrate was concentrated under vacuum to a small volume. A solution of 5.4 grams of p-benzoquinone in 50 cubic centimeters of alcohol was added to the residue, followed by renewed vacuum evaporation to yield a crystalline paste. This was filtered off by vacuum at −20° C. and washed with well-cooled ethanol. Some quinhydrone admixed to the residue was removed by leaching with cold alcohol. There remained 3.3 grams of the desired compound of Formula II of melting point 138.5–140.5° C. Recrystallization from alcohol yielded 2.7 grams of melting point 141–142° C.

EXAMPLE III

*Synthesis of the Compound, 3-Chloro-2-Amino-5,6,7,8-Tetrahydro-1,4-Naphthoquinone-Ethyl N-Carboxylate, as Represented by the Formula:*

(III)

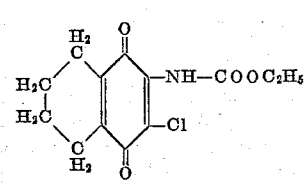

2 - amino - 3-chloro-5,6,7,8-tetrahydro-1,4-naphthoquinone, in amount of 42.4 grams (0.2 mole), in 300 cubic centimeters of ethyl acetate was reduced to the hydroquinone in the presence of 10 grams of Raney nickel. After the addition of 38.8 grams of diethyl pyrocarbonate, the mixture was slowly heated and then kept at the boil until no more carbon dioxide evolved. The catalyst was now removed by vacuum filtration in the cold, and the filtrate was dried in vacuo. A solution consisting of 21.6 grams (0.2 mole) of p-benzoquinone in 200 cubic centimeters of alcohol was slowly added with stirring to the nearly colorless residue, and after some time the precipitate which formed was separated by vacuum filtration and washed with well-cooled alcohol. To remove admixed quinhydrone, the reaction product was repeatedly extracted with hot water. The air-dried material (29.0 grams of M.P. 101–107° C.) was purified by a single recrystallization from 150 cubic centimeters of alcohol. The desired compound of Formula III was obtained in a yield of 16.4 grams in the form of yellow crystals melting at 117.5–118.0° C.

EXAMPLE IV

Synthesis of the Compound, N-[Naphthoquinone-(1,4)-yl-(2)]-N'-Phenyl-Thiourea, as Represented by the Formula:

(IV)

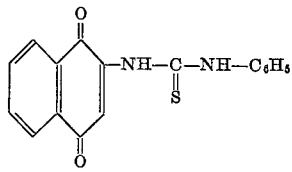

2-amino-1,4-naphthoquinone, in amount of 17.3 grams (0.1 mole), in 125 cubic centimeters of ethyl acetate was reduced to the hydroquinone in the presence of 5 grams of Raney nickel. The catalyst was subsequently removed by vacuum filtration, and 12 cubic centimeters (1.0 mole) of phenyl isothiocyanate were added to the filtrate. Considerable heat evolved, and after some time the light colored hydroquinone-thiourea precipitated. Thereafter a solution consisting of 10.8 grams of p-benzoquinone in 50 cubic centimeters of ethyl acetate was added to the reaction mixture, causing conversion to the orange-red quinone derivative. After stirring of the mixture overnight, the product was filtered off by vacuum, washed with ethyl acetate, and permitted to dry. The crude compound (23.1 grams), conforming to the compound of Formula IV, was recrystallized twice from glacial acetic acid, and once from Solketal. It forms orange-colored crystals (14.7 grams) which undergo no change in the melting point apparatus up to 300° C.

EXAMPLE V

Synthesis of the Compound, 2-Methylamino-3-Chloro-1,4-Naphthoquinone-Ethyl N-Carboxylate, as Represented by the Formula:

(V)

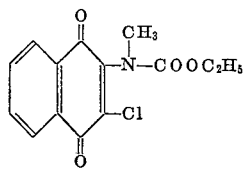

2-methylamino-3-chloro-1,4-naphthoquinone, in amount of 22.2 grams (0.1 mole), in 150 cubic centimeters of alcohol was reduced to the hydroquinone in the presence of 5 grams of Raney nickel. The catalyst was then separated, and 19.4 grams (0.12 mole) of diethyl pyrocarbonate were added to the filtrate. Carbon dioxide was evolved at once; the evolution being completed after some time by mild heating. The mixture was then concentrated to a small volume, 10.8 grams (0.1 mole) of p-benzoquinone in 100 cubic centimeters of alcohol was added, and the mixture stored in a refrigerator. A few days later, crystals had precipitated which were filtered off by vacuum, washed with a small amount of alcohol and dried. The crude yield of the compound of Formula V amounted to 23 grams. It is purified by recrystallizing or re-precipitating once from alcohol, twice from ethyl acetate-petroleum ether, and once more from alcohol. In this manner 10.8 grams of a yellow product of melting point 113.0–115.5° C. was obtained. The analytically pure compound melts at 115–116° C.

EXAMPLE VI

Synthesis of the Compound, 2-Amino-3-Chloro-1,4-Naphthoquinone-Eethyl N-Carboxylate, as Represented by the Formula:

(VI)

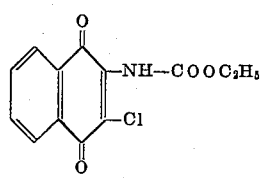

2-amino-3-chloro-1,4-naphthoquinone, in amount of 20.8 grams (0.1 mole), was suspended in 150 cubic centimeters of ethyl acetate and reduced with hydrogen to the hydroquinone in the presence of 5 grams of Raney nickel. Thereafter, 19.4 grams (0.12 mole) of diethyl pyrocarbonate were added to the reduction mixture, and the mixture was slowly heated and maintained at the boil until no more carbon dioxide was liberated. The catalyst was then removed by vacuum filtration, and the filtrate was concentrated in vacuo to a small volume. An alcoholic solution of 10.8 grams (0.1 mole) of p-benzoquinone was added to the residue, and the precipitate which soon formed was filtered off by vacuum and was then washed with alcohol until its color was pure yellow to yield the desired compound of Formula VI of melting point 143–145° C. Recrystallization from alcohol yielded 7.2 grams of a pure product melting at 149–150° C.

Having thus described the subject matter of our invention, what it is desired to secure by Letters Patent is:

1. As a new composition of matter, a compound selected from the group consisting of N-[naphthoquinone-(1,4)-yl-(2)]-N'-[ethoxycarbonylmethyl]-urea; 3-methoxy-2-amino-1,4-naphthoquinone-ethyl N-carboxylate; 3-chloro-2-amino-5,6,7,8-tetrahydro-1,4-napthoquinone-ethyl N-carboxylate; and N-[naphthoquinone-(1.4)-yl-(2)]-N'-phenyl-isothiourea.

2. As a new composition of matter, the chemical compound N-[naphthoquinone-(1,4)-yl-(2)]-N'-[ethoxycarbonylmethyl]-urea.

3. As a new composition of matter, the chemical compound 3-methoxy-2-amino-1,4-naphthoquinone-ethyl N-carboxylate.

4. As a new composition of matter, the chemical compound 3-chloro-2-amino-5,6,7,8-tetrahydro-1,4-naphthoquinone-ethyl N-carboxylate.

5. As a new composition of matter, the chemical compound N-[naphthoquinone-(1,4)-yl-(2)]-N'-phenyl-thiourea.

References Cited in the file of this patent

UNITED STATES PATENTS 2,913,453   Petersen et al. _____ Nov. 17, 1959

FOREIGN PATENTS 943,166   Germany _____ Aug. 16, 1956

OTHER REFERENCES

Fieser et al.: J. Am. Chem. Soc., vol. 70, pp. 3212-15 (1948).